United States Patent
Hussmann et al.

(10) Patent No.: US 8,050,068 B2
(45) Date of Patent: Nov. 1, 2011

(54) VARIABLE REACTIVE ELEMENT IN A RESONANT CONVERTER CIRCUIT

(75) Inventors: Stephan Helmut Hussmann, Heide (DE); Aiguo Hu, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 918 days.

(21) Appl. No.: 10/558,338

(22) PCT Filed: May 21, 2004

(86) PCT No.: PCT/NZ2004/000097
§ 371 (c)(1),
(2), (4) Date: Mar. 31, 2008

(87) PCT Pub. No.: WO2004/105226
PCT Pub. Date: Dec. 2, 2004

(65) Prior Publication Data
US 2008/0211478 A1 Sep. 4, 2008

(30) Foreign Application Priority Data

May 23, 2003 (NZ) ........................................ 526116
Nov. 27, 2003 (NZ) ........................................ 529869

(51) Int. Cl.
*H02M 7/217* (2006.01)
(52) U.S. Cl. .......... 363/97; 363/21.02; 363/25; 363/134
(58) Field of Classification Search ............... 363/21.02, 363/21.03, 22, 23, 24, 25, 26, 97, 133, 134
See application file for complete search history.

(56) References Cited

U.S. PATENT DOCUMENTS

| 5,267,133 | A | * | 11/1993 | Motomura et al. ........ 363/21.03 |
| 5,293,308 | A | | 3/1994 | Boys et al. |
| 5,450,305 | A | | 9/1995 | Boys et al. |
| 5,684,678 | A | | 11/1997 | Barrett |
| 5,831,348 | A | | 11/1998 | Nishizawa |
| 5,892,300 | A | | 4/1999 | Rydval |
| 5,898,579 | A | | 4/1999 | Boys et al. |
| 5,909,362 | A | | 6/1999 | Adams |
| 5,953,642 | A | | 9/1999 | Feldtkeller et al. |

(Continued)

FOREIGN PATENT DOCUMENTS
DE 19961228 6/2001
(Continued)

OTHER PUBLICATIONS

Green A. and Boys J.T., "10kHz inductively coupled power transfer-concept and control", IEE Power Electronics and Variable Speed Drives Conference, Pub 399, pp. 694-699, 1994.

*Primary Examiner* — Jeffrey L Sterrett
(74) *Attorney, Agent, or Firm* — Young & Thompson

(57) ABSTRACT

A resonant converter is provided which may be used for supplying power to the primary conductive path of an inductively coupled power transfer (ICPT) system. The converter includes a variable reactive element in the resonant circuit which may be controlled to vary the effective inductance or capacitance of the reactive element. The frequency of the converter is stabilised to a nominal value by sensing the frequency of the converter resonant circuit, comparing the sensed frequency with a nominal frequency and varying the effective inductance or capacitance of the variable reactive element to adjust the converter frequency toward the nominal frequency.

44 Claims, 6 Drawing Sheets

Figure 1:
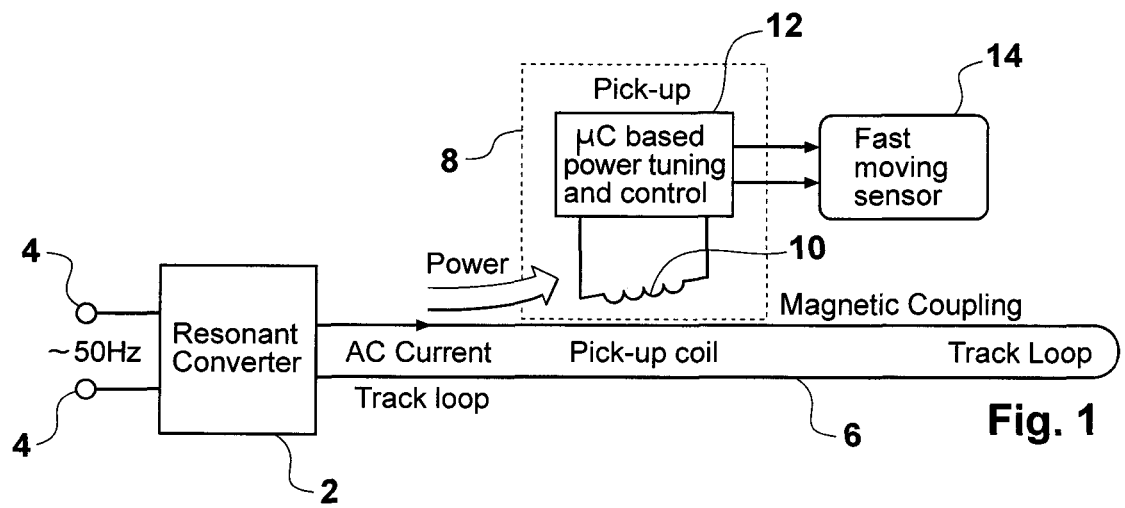

| U.S. PATENT DOCUMENTS | | | |
|---|---|---|---|
| 6,173,899 B1 | 1/2001 | Rozin | |
| 6,430,064 B1 * | 8/2002 | Tsuchimoto et al. | 363/24 |
| 6,462,432 B1 | 10/2002 | Seelig et al. | |
| 6,487,095 B1 * | 11/2002 | Malik et al. | 363/25 |
| 2003/0006880 A1 | 1/2003 | Zimmer | |
| 2003/0210106 A1 | 11/2003 | Cheng et al. | |
| 2004/0130916 A1 * | 7/2004 | Baarman | 363/21.02 |

| FOREIGN PATENT DOCUMENTS | | |
|---|---|---|
| EP | 0430358 | 6/1991 |
| GB | 2293702 | 4/1996 |
| JP | 2000116145 | 4/2000 |
| WO | WO-99/26329 | 5/1999 |
| WO | WO-01/18936 | 3/2001 |

\* cited by examiner

VARIABLE REACTIVE ELEMENT IN A RESONANT CONVERTER CIRCUIT

CROSS REFERENCE TO PRIOR APPLICATION

This is a U.S. National Phase application under 35 U.S.C. §371 of International Patent Application No. PCT/NZ2004/000097, filed May 21, 2004, which claims priority to New Zealand Patent No. 529869, filed on Nov. 27, 2003, which claims priority to New Zealand Patent No. 526116, filed May 23, 2003. The International Application was published on Dec. 2, 2004 as WO 2004/105226 A1 under PCT Article 21(2).

FIELD OF THE INVENTION

This invention relates to resonant converters. The invention has particular application to Inductively Coupled Power Transfer (ICPT) power supplies, but the invention is not limited to this application.

BACKGROUND

Converters are widely used for various power conversion and control applications, including converting sources of direct current (DC) electrical energy into alternating current (AC) power supplies. In particular, current-fed resonant converters are widely used for various DC and AC powers supplies, due to their efficient and compact features.

A successful application of current-fed resonant converters is in Inductively Coupled Power Transfer (ICPT) systems. Other applications include induction heating.

In these and other applications of resonant converters, undesirable frequency shifts can occur, which are subject to load or circuit parameter variations. These can result in significant reduction of system power transfer capacity.

These problems can be overcome, but this requires complex design which is expensive to implement, such as third generation (G3) power supplies using complicated LC converting networks.

One example of the difficulties created by frequency shifts is resonant converter power supplies in ICPT systems. These systems (which are also known as contactless power supplies) are known to have significant advantages in applications such as the materials handling, lighting and transportation industries. There are many applications in both high and low power systems in which use of these power supplies is particularly advantageous.

ICPT systems have a primary conductive path supplied with current from a power supply which is usually a resonant converter such as a current-fed resonant converter. One or more secondary devices (which may be referred to as pick-ups) are provided adjacent to, but electrically isolated from, the primary conductive path. The pick-ups have a pick up coil in which a voltage is induced by the magnetic field associated with the primary path, and supply a load such as an electric motor, a light, or a sensor, for example. The pick-up coil is tuned using a tuning capacitor to increase power transfer to the pick-up.

The load that each pick-up supply will typically fluctuate or vary, and this load change is reflected through the mutual inductive coupling back to the supply, which affects the supply frequency. This frequency drift in turn has an adverse effect on the pick-ups because the tuning capacitor for each pick-up tunes the pick-up coil to the resonant frequency of the converter. As the converter resonant frequency drifts away, the power transferred to the pick-ups decreases, so the system becomes inefficient. Further information about the construction and design of current-fed push/pull resonant converters, particularly as they apply to ICPT applications, can be found with reference to the specification of U.S. Pat. No. 5,450,305 assigned to Auckland UniServices Limited. Further information on ICPT systems, power supplies and pick-ups for such systems can be found with reference to the specification of U.S. Pat. No. 5,293,308 also assigned to Auckland UniServices Limited.

One approach that has been used in an attempt to maintain the frequency of a converter circuit at or near resonance in response to variations in load has been to provide a plurality of capacitors in the resonant circuit which may be switched in or out of the circuit. This approach has been proposed in recently published United States patent application US2003/0210106. Switching a plurality of individual capacitors into or out of the resonant circuit means that the circuit frequency can only be controlled in a stepwise fashion. This is particularly disadvantageous with high Q systems since many separate capacitors are required, adding to cost and complexity. It also means that load variations have to be limited to make the system function effectively.

OBJECT

It is an object of the present invention to provide a resonant converter which will overcome disadvantages associated with existing constructions, or which will at least provide a useful alternative.

BRIEF SUMMARY OF THE INVENTION

Accordingly in one aspect the invention provides a resonant converter including an input for connection to a substantially direct current electrical supply, a resonant circuit, first switching means to selectively provide current from the input to the resonant circuit, second switching means associated with a reactive component of the resonant circuit, and switch control means operable to control the second switching means to vary the effective reactance of the reactive element.

The converter may include phase sensing means to sense the phase of a voltage or current in the resonant circuit whereby the control means may actuate the second switching means to allow the reactive element to be electrically connected to or disconnected from the resonant circuit dependant on the sensed phase.

The reactive element may comprise an inductor or a capacitor which may be a component that is connected in series or parallel with the resonant circuit. If the reactive element is an inductor, it may comprise the primary conductive path of an ICPT system or comprise the induction element of an induction heating device. If the reactive element is a capacitor it may comprise the resonant circuit tuning capacitor.

The phase sensing means may sense a voltage in the resonant circuit and the switch control means may be operable to switch the second switching means to electrically connect the inductor to the resonant circuit with a predetermined time period after a sensed voltage zero crossing. If the reactive element is a capacitor, it may be disconnected from the resonant circuit with a predetermined time period after a sensed voltage zero crossing.

Frequency sensing means may be used to sense the frequency of the resonant circuit whereby the control means may actuate the second switch means to allow the reactive element to be electrically connected to or disconnected from the resonant circuit dependant on the sensed frequency to alter the frequency of the resonant circuit. The phase sensing means may be used to sense the circuit frequency.

The control means may compare the sensed frequency with a nominal frequency and vary the predetermined time period to alter the resonant circuit frequency toward the nominal frequency.

In the preferred embodiment the control means is capable of varying the predetermined time period between substantially 0 electrical degrees and substantially 180 electrical degrees. For an inductive reactive element range is between substantially 90 electrical degrees and substantially 150 electrical degrees. For a capacitive reactive element the element may be disconnected from the resonance circuit with the predetermined time period being in a range between substantially 0 electrical degrees and substantially 90 electrical degrees.

The invention also provides a current fed push-pull resonant converter including an input for connection to a substantially direct current electrical supply, a resonant circuit including a primary conductive path of an ICPT system, first switching means to selectively provide current from the input to the resonant circuit, second switching means associated with a reactive component of the resonant circuit, and switch control means operable to control the second switching means to vary the effective reactance of the reactive element. This may be used to provide a power supply for an ICPT system.

In another aspect the invention also provides an ICPT system including:
  a. A power supply comprising a resonant converter having a resonant circuit including a primary conductive path of an ICPT system, first switching means to selectively provide current from the input to the resonant circuit, second switching means associated with a reactive component of the resonant circuit, and switch control means operable to control the second switching means to vary the effective reactance of the reactive element;
  b. One or more secondary pick-ups, each pick-up having a pick up resonant circuit comprising a pick-up coil and a tuning capacitor whereby power from the primary conductive path may be transferred to the pick-up by mutual induction between the primary conductive path and the coil.

The primary conductive path may be provided beneath a substantially planar surface and may have at least one region about which there is a greater magnetic field strength than one or more other regions of the path.

The primary conductive path may include one or more lumped inductances or one or more distributed inductances. It may also be mounted adjacent to an amorphous magnetic material to provide a desired magnetic flux path.

Similarly the pick-up may include an amorphous magnetic material adjacent to the pick-up coil to provide a desired magnetic flux path. The pick-up may be battery-free. It may also include a super-capacitor.

In a further aspect the invention provides a method of frequency stabilisation for a resonant converter having a resonant circuit comprising an inductive reactive element and a capacitive reactive element, the method including the steps of selectively switching one of the reactive elements into or out of the resonant circuit to alter the effective inductance or capacitance of the reactive element to thereby control the frequency of the resonant circuit.

The phase of a voltage or current in the resonant circuit may be sensed and used to determine when to connect or disconnect the reactive element to or from the resonant circuit.

The method may also include the step of sensing the frequency of the resonant circuit, comparing the sensed frequency with a nominal frequency and varying the predetermined time period to alter the resonant circuit frequency toward the nominal frequency.

The invention may also broadly be said to consist in any new part, feature or element disclosed herein, or any new combination of such parts, features or elements.

DRAWING DESCRIPTION

Figure 2:
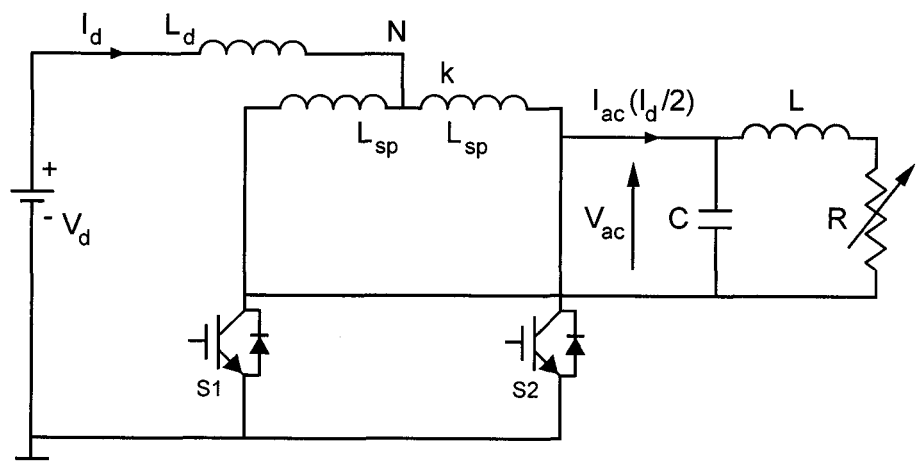
Figure 3:
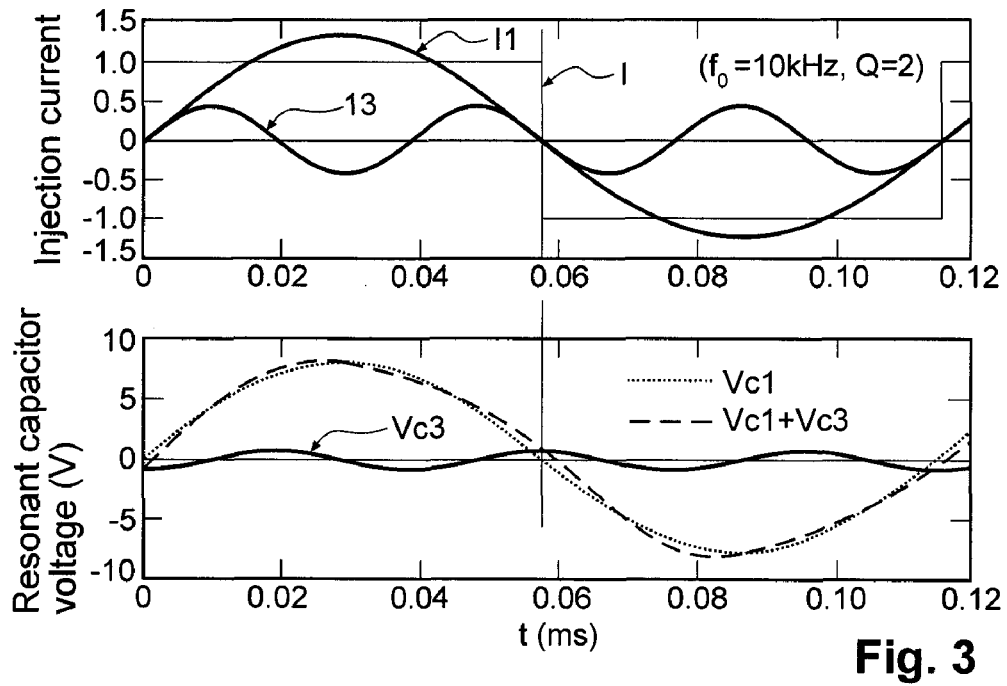
Figure 4:
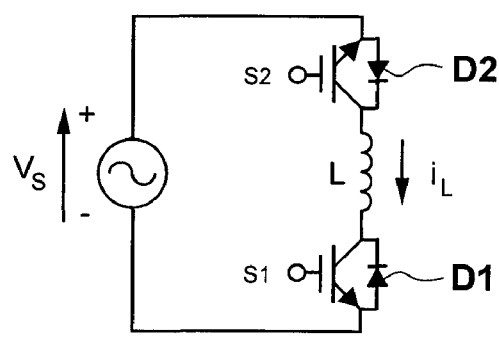
Figure 5A:
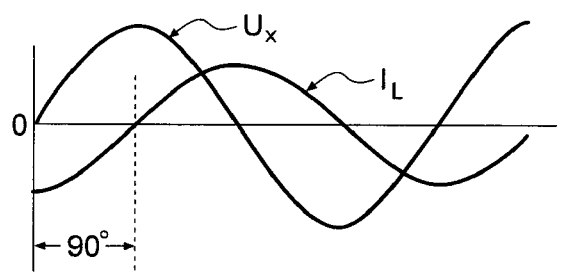
Figure 5B:
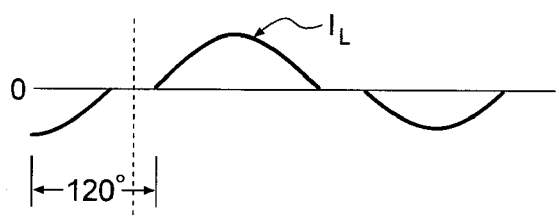
Figure 5C:
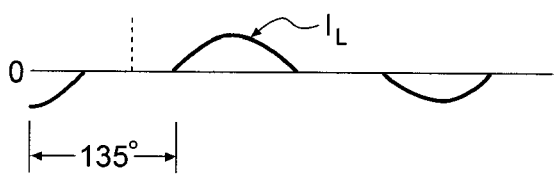
Figure 6:
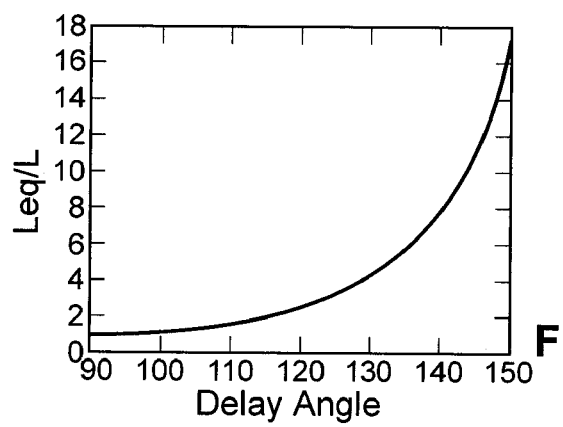
Figure 7:
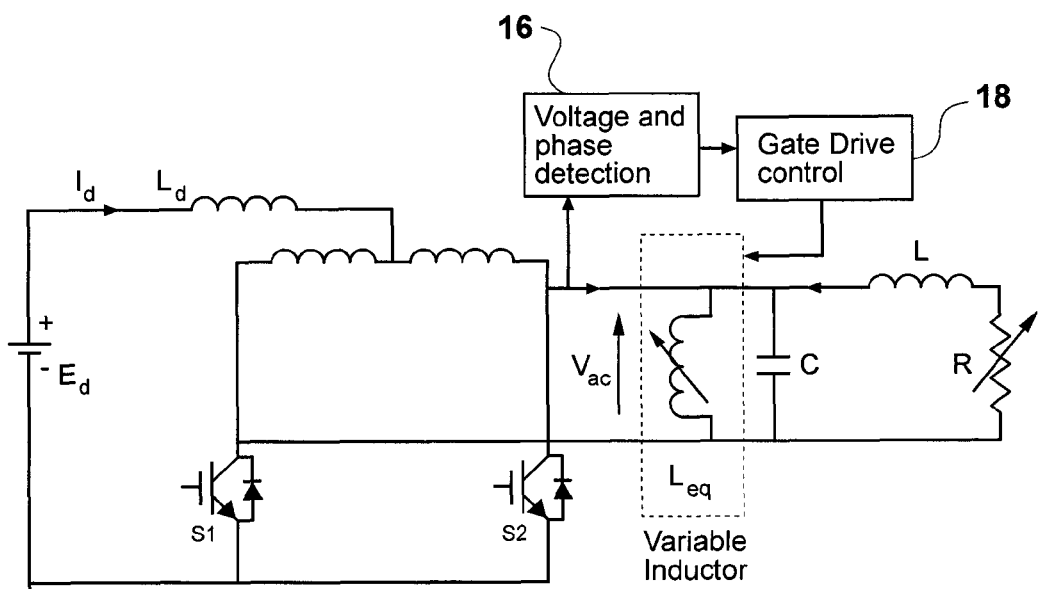
Figure 8:
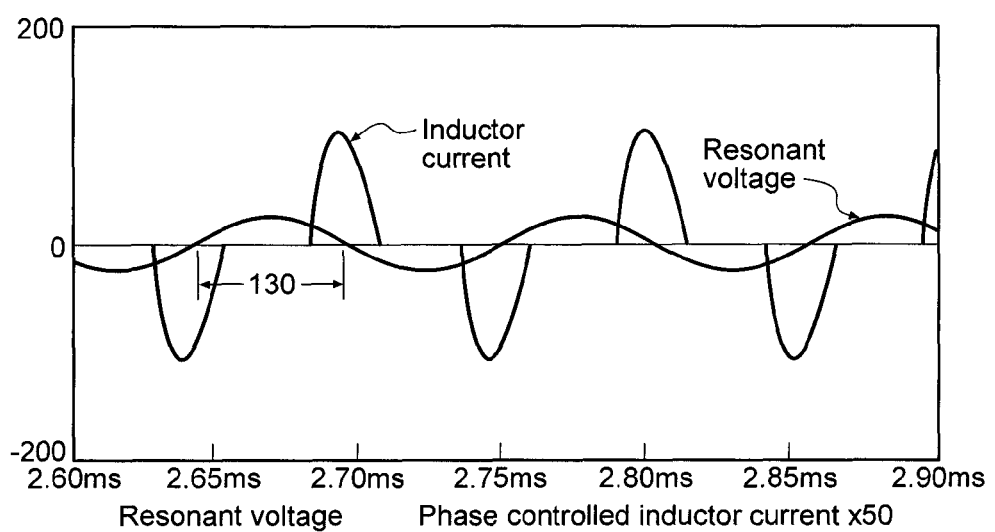
Figure 9:
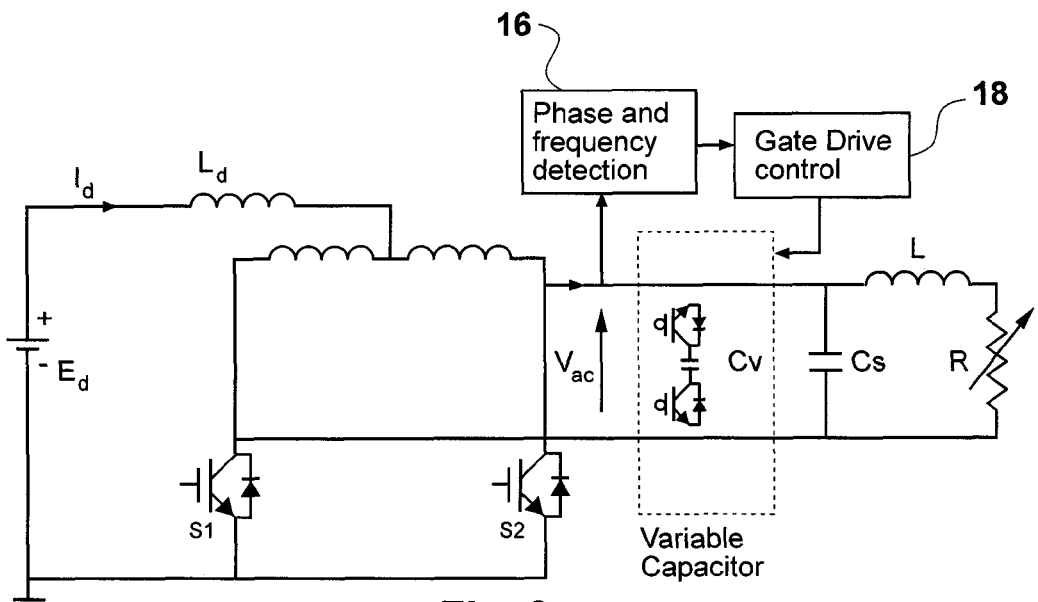
Figure 10A:
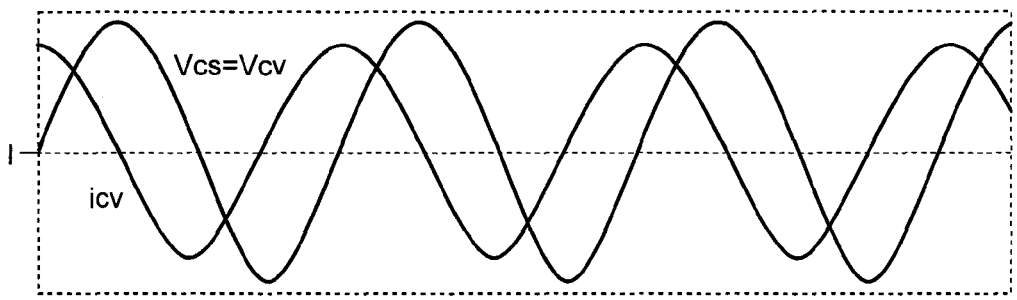
Figure 10B:
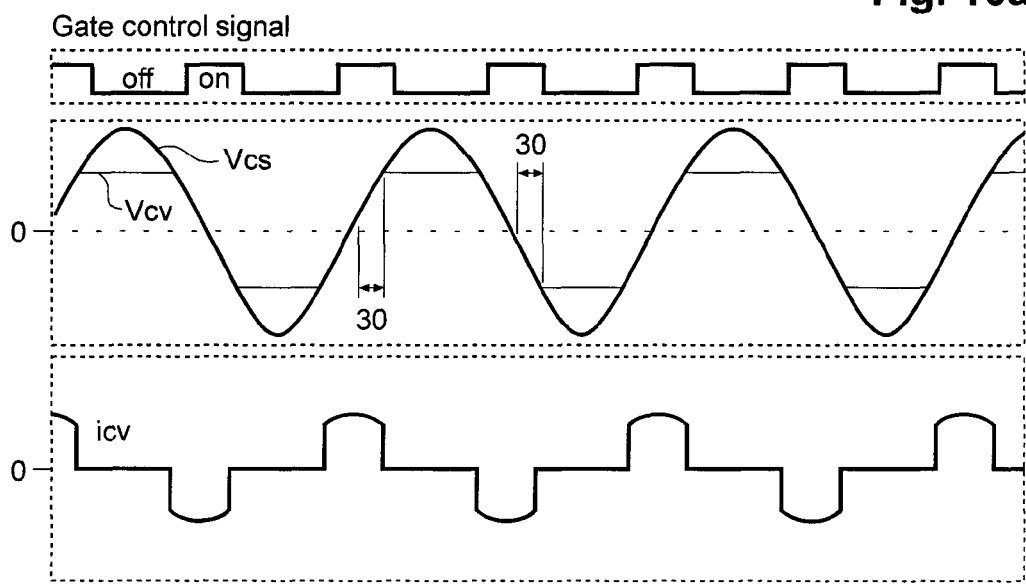
Figure 11:
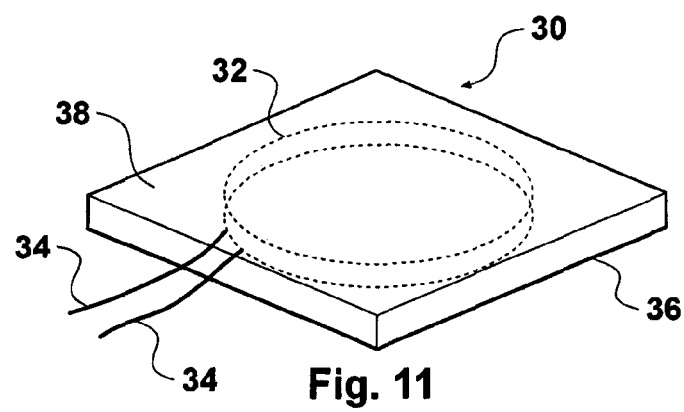
Figure 12:
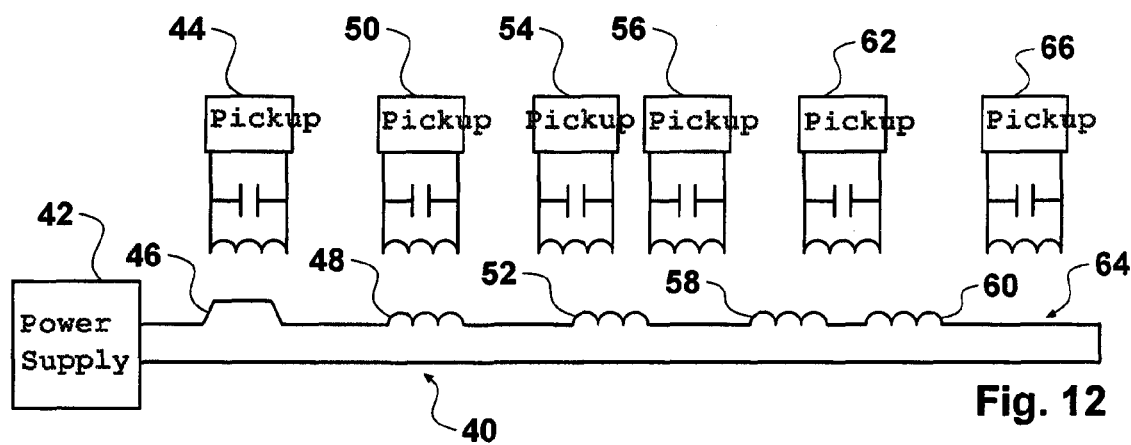

One or more examples of an embodiment of the invention will be described below with reference to the accompanying drawings in which FIG. 1: is a general diagram of a known ICPT power supply system;

FIG. 2: is a circuit diagram for a known push/pull current fed parallel resonant converter;

FIG. 3: shows plots of injection current and resonant capacitive voltage against time for the converter of FIG. 2;

FIG. 4: is a circuit diagram of a phase control variable inductor according to the invention;

FIGS. 5*a* to 5*c*: show current wave forms of the controlled inductor of FIG. 4 with reference to the source voltage;

FIG. 6: is a plot of equivalent inductance change against delay angle for the controlled inductor of FIG. 4;

FIG. 7: is a circuit diagram of a push/pull current-fed resonant converter suitable for an ICPT power supply including the phase controlled variable inductor of FIG. 4;

FIG. 8: is a plot showing the typical current wave form of the controlled inductor in the circuit of FIG. 7 with reference to the resonant voltage;

FIG. 9: is a circuit diagram of a push/pull current-fed resonant converter suitable for an ICPT power supply including a controlled variable capacitor;

FIGS. 10*a*-10*b* show the voltage and current waveforms relating to the controlled variable capacitor of FIG. 9, FIG. 11: is a perspective view of a device including a lumped primary conductive path of an ICPT system;

FIG. 12: is a diagram of an alternative form of primary conductive path of an ICPT system.

DESCRIPTION OF PREFERRED EMBODIMENT(S)

Referring to FIG. 1, the basic structure of an inductively coupled power transfer (ICPT) system is shown. Such a supply is also often referred to as a contactless power supply system. The system generally comprises two electrically isolated parts. The first part consists of a power supply such as a resonant converter 2 which has inputs 4 for connection to a source of electrical energy. In this example the inputs 4 may be connected to a 50 Hz mains supply. The first part also includes a primary conductive path 6 which is supplied with alternating current from the resonant converter 2. The primary conductive path 6 is usually in the form of an elongated "track" or cable along which one or more of the second parts are located. However, the primary conductive path 6 may comprise a coil of conductive material. In this example, the main function of the converter is to supply a nominally constant high frequency (e.g. 40 kHz) AC current in the track loop.

The second part consists of one or more pickups 8 each of which includes a pickup coil 10. The pickup also includes a controller 12 to control the transfer of power from the track loop to the pickup. A suitable controller may include a shorting switch to substantially decouple the pick-up from the primary conductive path as described in U.S. Pat. No. 5,293,308 (Boys) assigned to Auckland UniServices Limited. The power is supplied to a load 14.

Due to the magnetic coupling between the primary conductive path 6 and the secondary pickup coil 10, an electromotive force is induced in the pickup coil 10. This voltage then becomes the source for the secondary power supply.

The resonant converter 2 is frequently a current fed parallel resonant converter. These are widely used for practical ICPT power supplies because they are more efficient and compact. For economic reasons, a large DC inductor is usually used in series with the voltage source to form a quasi current source (in the steady state) instead of using closed loop current control.

FIG. 2 shows the basic structure of a known push/pull current fed parallel resonant converter. It consists of a capacitor C in parallel with an inductor L and a series load R which can be the equivalent resistor referred back from the secondary power pick-up circuits. A DC inductor Ld smoothes the input current and the splitting transformer K, together with switch devices S1 and S2 (for example IGBT's) allow the input DC current from the "current source" to be divided into two directions so that the injected AC current into the resonant tank becomes half of the DC current. This occurs because the inductance of the splitting transformer windings Lsp is very large compared to the inductance of the resonant inductor L. The switch devices S1 and S2 are selectively or periodically switched by a controller as known to those skilled in the art to provide current to the resonant circuit.

For this circuit, it can be shown that the alternating voltage cross the tank circuit is approximately double the DC voltage Vd. It can also be shown that for a high Q system, the track inductor current is almost constant, being given (ignoring harmonics) by:

$$I_L = \frac{V_{ac}}{\sqrt{(\omega L)^2 + R^2}} \approx \frac{V_{ac}}{\omega_0 L} \frac{Q}{\sqrt{Q^2 + 1}}$$

It can be calculated from the above equation that if Q is greater than 3, the current drop from no load to full load is less than 5.13%. However, this is only true when the operating frequency is approximately constant. In practice, a current fed resonant converter power supply has many factors affecting the circuit resonant frequencies. The most obvious factor is load change, but circuit parameter variations can also cause the frequency to drift away from its nominal value. This frequency drift not only causes the track inductor current to fluctuate, but more importantly, it can significantly affect the tuning of power pickups of the ICPT system and loss of power transferability. Therefore, maintaining the power supply frequency stable is critical for ICPT systems having power pickups with fixed frequency tuning.

With regard to load, for the parallel resonant tank circuit shown in FIG. 2, under sinusoidal excitations its zero phase angle (unity power factor) resonant frequency changes with the load according to $$f_r = f_0 \sqrt{1 - \frac{1}{Q^2}}$$

Where the quality factor Q ($\omega_0 L/R$) reflects the load change.

The frequencies corresponding to the maximum inductor current and capacitor voltage also change and are governed by $$f_{i_L m} = f_0 \sqrt{1 - \frac{1}{2Q^2}} \quad \text{and}$$

$$f_{v_c m} = f_0 \sqrt{\sqrt{1 + \frac{2}{Q^2}} - \frac{1}{Q^2}} \quad \text{respectively.}$$

The real zero voltage switching operating frequency variation is much more complicated. This is because the injection current to the resonant tank is more like a square wave than a sine wave. Therefore the harmonic components will affect the actual frequency shift.

Referring to FIG. 3, the affect of the third harmonic component of a square wave current on the zero voltage switching (ZVS) operation is shown. If the switching frequency is at the zero phase angle resonant frequency, the fundamental voltage Vc1 and the fundamental current I1 will be in phase. But the third harmonic voltage Vc3 lags behind its driving current I3. This is because the resonant tank is capacitive at a frequency that is higher than the zero phase angle resonant frequency. As a result, the zero crossing points of the total voltage Vc1 plus Vc3 will be lagging that of the square wave current. Due to the parallel tuning property of the resonant tank circuit, the switching frequency, which is the same as the frequency of the square wave current, needs to be reduced to some extent so as to draw the phase back and keep ZVS in operation. This implies that the load effect on the actual ZVS frequency is larger than the zero phase angle resonant frequency. The actual ZVS operating frequency is lower than the zero phase angle resonant frequency at the same loading condition.

The present invention allows these problems with frequency shift to be overcome.

Referring now to FIG. 4, an inductor L is provided with two switches S1 and S2 connected in series with the inductor at either end of the inductor. Anti-parallel diodes D1 and D2 are provided across the switches and a voltage source Vs is provided. The preferred switches are semi-conductor switches such as MOSFETs or IGBTs, MCT's or BJT's. This is because these switches are capable of sufficiently fast operation to handle high frequencies such as 10 kHz to 100 kHz which is typical in ICPT systems. Since these switches allow only unidirectional current flow control two of them are used. Those skilled in the art will realise that another embodiment could use an appropriate single switch rather than two switches.

The arrangement shown in FIG. 4 allows the AC inductor current $I_L$ to be controlled in both directions by appropriate actuation of the switches S1 and S2.

The switches S1 and S2 are controlled by being switched on alternately (using appropriate gate drivers the design of which is known to those skilled in the art, as reported by Boys J. T. and Green A. in "Inductively coupled power transmission-concept, design and application", IPENNZ Transactions, No. 22 (1), pp. 1-9, 1995 the contents of which are incorporated herein by reference) with a phase delay angle according to the change of the voltage source direction. For example, in the positive half cycle of the voltage source Vs, switch S1 can be turned on. Likewise, in the negative half cycle, switch S2 can be turned on. In this example the phase delay angle is the same for both the switches, so that the outward current wave form is symmetrical. The IGBT's are each turned off when the inductor current goes to zero. Therefore, zero current switching is achieved automatically which minimises the switch losses and electromagnetic interference (EMI).

Turning to FIGS. 5a to 5c, typical current wave forms for the inductor current $I_L$ with reference to the source voltage Vs are shown. The magnitude of the inductor current is dependent on the switch activation phase delay angle. The phase of the voltage source Vs is detected, for example by using a zero-crossing detector. The phase delay angle for switch activation in the following examples is measured from the detection of a Vs zero crossing. When the delay angles are between 0° and 90°, as shown in FIG. 5a, the current is continuous so the maximum current flows through the inductor. When the delay angle is between 90° and 180°, the inductor current is discontinuous. The magnitude of the fundamental current $I_{L1}$ flowing in the inductor reduces as the delay angle is increased. This is shown in FIGS. 5b and 5c where the delay angle is 120° and 135° respectively. The magnitude of the fundamental current $I_{L1}$ is determined by:

$$I_{L1} = \frac{V_s}{\pi \omega L}(2\pi - 2\alpha + \sin 2\alpha)$$

where $(\pi/2 \leq \alpha \leq \pi)$.

If the harmonic components are ignored, the equivalent inductance of the phase controlled inductor would be:

$$L_{eq} = \frac{V_s}{\omega I_{L1}} = \frac{\pi}{2\pi - 2\alpha + \sin 2\alpha}L$$

Turning to FIG. 6, the relationship between the ratio of the effective or equivalent inductance to the actual inductance, and the delay angle, is shown. The equivalent inductance of the controlled inductor is equal to its self-inductance (i.e. the ratio is 1) when the delay angle is 90°. The equivalent inductance increases with corresponding increases in the delay angle.

In theory, if the delay angles are increased to 180° or more, the inductor current would be zero, i.e. the equivalent inductance would be infinity. This is because the active switches will not be able to conduct since the applied voltage is negative. In practice, when the delay angles approach 180°, the equivalent inductance increases very sharply. This makes it unsuitable for a practical controller design. Also, at high delay angles, the harmonic components become larger compared to the fundamental current because of the large discontinuous period. As a consequence, the equation above becomes less accurate in calculating the equivalent inductance with increasing delay angles.

Therefore, for a practical regulated design we have found that control may be achieved by controlling the phase delay angle between approximately 90° and approximately 150°, since we have found that a delay angle over 150° is essentially equivalent to switching off the inductor.

Although the phase controlled variable inductor can be connected in series with the resonant track inductor, In practice the frequency control based on such a configuration is difficult to design, as the voltage source reference is not very stable and additional capacitors have to be put in parallel with the variable inductor to achieve effective control. We have found that placement of the variable inductor in parallel with the resonant tuning capacitor is a good option. Since the output of the inverting network Vac has a voltage source property and has very small harmonic components, it can be treated as the voltage reference Vs previously shown in FIG. 4. An example of one embodiment of a power supply including our variable inductor design is shown in FIG. 7. As shown in that figure, the phase controlled variable inductor is placed in parallel with the resonant capacitor. Thus there is a first set of switches S1 and S2 that switch current from the DC supply into the resonant circuit of the converter as described above, and a second set of switches (not shown in this figure but shown in FIG. 4) that control the variable reactive element which in this embodiment is an inductor.

Thus with the circuit shown in FIG. 7, the variable inductor is controlled so that when the delay angle is at 90° or less the inductor is completely "on" and the frequency of the system is at the high end of the available range. This is because the inductor cancels some capacitance of the tuning capacitor so the total equivalent capacitance reduces, resulting in a higher resonant frequency. On the contrary, when the delay angle is close to or over 180°, the inductor is effectively switched off so that the operating frequency of the system is at the lower end of the available range. As mentioned above, we have found that in practice when a delay angle is close to or over 150°, then the inductor is effectively switched off, so in practical circumstances 150° delay effectively defines the other end of the operating frequency range. Between 90° and 180° (practically 90° to 150°) delay the inductance is controlled smoothly so that the operating frequency can be stabilised to its nominal value. The phase delay provides a predetermined time period before connection occurs in each half cycle, allowing control. Therefore, as the load changes (and any of the other factors that affect frequency shift), begin to affect the frequency, the variable inductor can be dynamically controlled by the switches S1 and S2 (FIG. 4) to change the delay angle and thus regulate the frequency to its normal or nominal value (or to a nominal value that may be selected). In this way, the undesirable effects of frequency change are substantially eliminated. The control mechanism is shown diagrammatically in FIG. 7 by phase detection unit 16 (which may comprise a zero-crossing detector) to detect zero crossings of the resonant circuit voltage and the direction of such crossings, or at least whether the voltage waveform is in the positive or negative half cycle. This information is supplied to the switch control unit 18. The zero crossing detection also provides a measurement of the frequency of the resonant circuit. Alternatively, this may be measured by another means or by a separate circuit. The information is supplied to control unit 18 (which may include a microprocessor) for controlling the switches (S1 and S2 in FIG. 4) across the variable inductor. Therefore, the frequency of the resonant circuit, as sensed, increases above the nominal resonant frequency of the circuit beyond a predetermined threshold then the phase delay angle is increased by a predetermined quantum to reduce the frequency. This control strategy may be implemented using techniques known to those skilled in the art.

In FIG. 8, a typical current wave form and its voltage reference with a phase delay angle of 130° are shown.

We have tested a 10 kHz current fed resonant converter ICPT power supply by adding the phase controlled variable inductor of the present invention in parallel with the parallel tuning capacitor. The results have shown that if the phase controlled inductor is designed such that at 120° delay, the system is running at its nominal 10 kHz, then at 90° delay the operating frequency is about 10.7 kHz and at 150° delay it is about 9.3 kHz. Under all the actual parameter variations and loading conditions range from no load to maximum load of this system, we have found that the operating frequency can be adjusted back to 10 kHz by changing the phase delay angle.

Rather than using a variable inductance, we have found that a variable capacitance may be used as a variable reactive component to maintain the desired frequency of the resonant circuit in a converter. Therefore, an example of a further embodiment of a power supply according to the invention is shown in FIG. 9. Referring to that figure, circuit elements that are the same as or similar to those described with reference to the embodiment shown in FIG. 7, are labelled using the same reference numerals. As can be seen, the primary difference is the use of a variable capacitance 20, rather than a variable inductance. The controlled variable capacitor 20 may be placed in parallel with the resonant capacitor C. Alternatively, a variable capacitance may be used to completely replace the tuning capacitor. The variable capacitor includes a capacitor Cv and switches 24 and 26, which may be controlled to allow selected conduction of the capacitor Cv thus to vary the effective of capacitance of the tank circuit. Because the original tuning capacitor and the new variable capacitor Cv are in parallel, zero voltage switching techniques are preferably used to ensure smooth transients, as well as minimise the power losses and EMI. Detection means (not shown) detect current output by the supply shown in FIG. 9 and this information is used by control means (not shown) to control switches 24 and 26 to dynamically vary the effective or equivalent capacitance and thus the frequency of the tank circuit. In this way the output frequency may be controlled to be substantially constant.

We have found that a circuit in which the variable capacitance Cv is arranged in parallel with the tuning capacitor C allows an adequate range of capacitance to be provided to allow reasonable control. The tuning capacitor C may be selected to be approximately one half of the capacitance actually required to provide resonance at the intended primary current frequency. The variable capacitor Cv may also comprise a capacitor of the same magnitude (i.e. one half of the capacitance required to provide resonance at the intended primary current frequency). The sum of the capacitance of tuning capacitor C and variable capacitor Cv is chosen to be greater than the capacitance required to provide the tank circuit with its desired natural resonant frequency (i.e. the nominal resonant frequency for the supply). In this way, the variable capacitor Cv can be selectively "switched out" of the circuit to provide an overall equivalent capacitance for the circuit which allows it to operate at the nominal resonant frequency, if desired. Also, depending upon how "much" of the variable capacitor is effectively switched out of the circuit will allow the tank circuit to have a natural frequency which may be varied from below the nominal resonant frequency to some value above the nominal resonant frequency. Phase detector 16 and control unit 18 function in a similar way to their equivalents described above with reference to FIG. 7.

FIGS. 10*a* and 10*b* show typical voltage and current waveforms of the controlled variable capacitor. Referring to FIG. 9, when the two switches that connect Cv to the circuit are always on, corresponding to the situation when the control phase angle (with reference to switching off is zero electrical degrees, the current would be 90 electrical degrees leading the total resonant voltage across the two capacitors, as shown in FIG. 10*a*. When the phase angle is controlled between 0-90 degrees, capacitor Cv will be disconnected for a period. For example, FIG. 10*b* shows waveforms for the gate (switch) control signal, the voltage across Cv (Vcv), the voltage across Cs (Vcs), and the current through Cv (icv) for the situation when the phase angle is about 30 degrees. When the switches are off, the voltage across Cv is kept constant and its current is zero. When the switches are controlled to be on, its voltage is equal to the total resonant voltage and a current flows through capacitor Cv. The phase angle provides a predetermined time period before which disconnection occurs. If the phase angle is equal to or over 90 degrees, the capacitor is essentially off all the time. Therefore, by controlling the phase angle between 0 to 90 electrical degrees, the conduction period of the capacitor Cv is controlled, so the effective capacitance varies between its maximum value and zero.

With relevance to ICPT systems, the invention may be used to energise a primary conductive path that may take a variety of different forms. For example, referring FIG. 11, a generally planar housing 30 is shown, within which a conductor 32 is disposed. As can be seen from the drawing, the conductor 32 may be provided in the form of a loop or coil of conductive material. In the most preferred embodiment, a number of turns of conductive material are provided and the conductor connection cables 34 exit the unit at an appropriate location to be connected to a power supply including a converter as described in one or more of the foregoing embodiments. If desired, the cables 34 may terminate in a plug or socket for electrical connection with a corresponding socket or plug associated with the power supply. Alternatively, although not shown, the converter may be provided within the housing. Therefore, the housing may include external conductors for connection to a mains alternating current power supply, and a converter within the housing may rectify and filter the mains supply to provide an appropriate DC source which the converter then switches across the resonant circuit to provide the required AC supply for the conductor 32.

In the preferred embodiment, the pad 30 may comprise a pad which is commonly used for a "point and click" device such as a mouse, or could comprise part of a desktop surface or similar surfaces. For example, the housing 30 may be provided as part of a food tray or work surface (such as a folding food tray) in a vehicle such as an aircraft, train, bus or the like. Housing 30 could also be part of stone seats, wall tiles (used for heating) or towel rack (used for drying) in spas, saunas, bathrooms etc. It could be also used for animal cages to provide power to implants inside the animals such as rabbits, mice etc. The body of the housing is preferably constructed from a nonconductive material, but may include amorphous magnetic material 36 in one or more parts of the apparatus or in the apparatus as a whole. Such material can provide appropriate flux path(s) so that secondary devices may be placed in the vicinity of the housing 30, most preferably on the surface 38 of the housing, and be powered by mutual induction from the coil 32. Housing 30 can also work under water.

Apparatus which may include secondary pickup devices for use in conjunction with the housing 30 may include a variety of devices which would normally be powered by one or more batteries, but may also include other devices for which it is convenient to have cordless operation. Such devices may include "point and click" devices (e.g. a mouse), cellular telephone devices, PDA's, notebooks or laptops, electric toothbrushes, electric shavers etc These devices may include rechargeable cells or batteries of cells which the pickup recharges by power which is induced in the pickup coil from coil 32. Alternatively, the devices (e.g. a mouse) may not require a battery as such because the device is only used in the vicinity of coil 32. Therefore the supply may be used to power battery and non-battery equipped pick-ups.

Furthermore, the unit 30 may alternatively or in addition to conductor 32 include specific region for location of a device to which energy is to be supplied. For example, one or more ferrite cores may be provided within the unit 30 with various markings on the upper surface 38 to indicate where a power receiving device should be placed. The upper surface 38 may be formed or contoured (for example by being appropriately moulded) to receive or accommodate the power receiving device. Therefore the invention is applicable to both loosely and closely coupled systems. The power supply provided by the invention allows this flexibility because the variations in load that occur as a result of coupling strength can be accommodated by the supply. If a "step-wise" approach is used for power supply frequency control, then load variations have to be limited to make the system function effectively.

The use of the power supply embodiments discussed above to power the primary conductive path 32 has the advantage that a number of different devices may be placed on housing 30 to be powered by the coil 32. These multiple devices, which increase the load on the power supply, would normally tend to affect the power supply frequency. However, the dynamic tank circuit tuning provided by the invention means that multiple loads or changes in load do not affect system performance.

Those skilled in the art will appreciate that the primary conductive path 32 within housing 30 may take a variety of different forms. In particular, a separate housing as such is not required. In some circumstances all that may be required is a conductor 32 which is provided in or on an underside of an appropriate surface such as a desktop for example. Also, rather than having the primary conductor arranged as a coil, a number of different configurations are possible. For example, a conductive path may be etched or printed on appropriate substrates such as a printed circuit board and the conductive path(s) may be arranged so as to provide a desired flux path or a plurality of desired flux paths which may be stationary or moving. For example, the flux paths may be designed to pad "rotate" so that a pick-up device may be placed in a variety of different positions or orientations adjacent to conductive path 32 and still receive sufficient energy to supply the required load.

Turning to FIG. 12 another embodiment of a primary conductive path for an ICPT power supply is shown. In this embodiment, the primary conductive path is generally referenced 40, and a supplied by power supply 42 which may include a converter according to one or more of embodiments described above.

The primary conductive path 40 may simply comprise a loop of conductive material. This material is preferably a multi-strand conductive material such as copper wire for example. However, as shown in FIG. 12, it may be preferable in applications where pickups remain stationary relative to the primary conductive path 40 for the primary conductive path to be adapted to optimise power transfer to those pick-ups. An example of use of a primary conductive path to supply pick-ups that remain stationary relative to the path includes use of an ICPT system in a boat, a swimming pool or bath, a building, or a vehicle. To take the example of a boat, the primary conductive path may be provided in the boat during manufacture. In this way, the primary conductive path remains physically and electrically isolated so as not to be prone to damage and it is hidden so it does not interfere with the appearance of the structure. Power can be delivered to pick-up devices fitted in or on the boat without requiring the integrity of the boat structure to be compromised. In particular the hull does not need to be penetrated to install equipment such as depth or speed sensors. Alternatively, the primary conductive path may be retro-fitted to a boat after manufacture.

In order to facilitate power transfer from the primary conductive path on the boat to pick-ups, the primary conductive path may be modified in various predetermined positions about the boat structure. For example, in the vicinity of pickup 44 (which may comprise a navigation light for example), the conductive path may be widened at location 46 to provide an elongated or distributed region of increased magnetic field to facilitate power transfer to the pickup 44. Similarly, at location 48, one or more turns of conductive material may be included in the primary conductor (for example by looping the primary conductor) to facilitate data transfer to the pickup which may need a more significant energy requirement, for example an instrument panel that may be powered by pickup 50. Therefore a "hotspot" or region of relatively intense magnetic field strength is created. Similarly, a further "hotspot" may be provided at location 52 in the primary conductive path for powering more than one pickup, such as pickups 54 and 56. If required, more than one "hotspot" may be provided as shown by regions 58 and 60 which can power a pickup 62 that has a more significant power requirement such as a battery charging device for example. Finally, simple elongated regions of primary conductive path that are unmodified, such as region 64 can be used to supply devices that may have a low power requirement and which may need to be moved about relative to the primary conductive path. For example, the position of a navigation light supplied by pickup 66 and provided on the mast of the boat may need to be changed from time to time, so a simple length of primary conductor 64 may be provided on the mast of the boat, so that the pickup characteristic is uniform along the relevant portion of the mast.

Further applications of the invention include bioengineering applications such as implants for biological research or drug tests, waterproof applications, explosion proof applications, the mining industry (e.g. lights, sensors), the forestry industry (e.g. sensors), moving sensor applications (e.g. robots, optical sensors), heating systems (e.g. seat heating, towel drying).

As mentioned above the invention may be used to supply pick-ups that include batteries or which are battery-free. Furthermore, the pick-ups may include a super-capacitor as an energy storage device, which can be charge/discharged very quickly, and is very safe and almost maintenance free having a long life span.

The invention provides a converter that has a frequency controlled resonant circuit, having advantages in a number of different applications, particularly ICPT power supplies for closely coupled or loosely coupled systems. Those skilled in the art will appreciate that the reactive element that is selectively phase controlled may comprise the circuit resonant element itself such as the converter tuning capacitor or the primary conductive path of an ICPT system.

The preferred features of the invention are applicable to all aspects of the invention and may be used in any possible combination. For example, those skilled in the art will appreciate that the controlled variable reactive elements may be used in series tuned circuits as well as the parallel tuned circuits described by way of example above.

Where the words "comprise" "have" or "contain" are used in this document, or variations of these word such as comprises and comprising, these are intended to be interpreted in an inclusive sense i.e. to mean "including but not limited to" unless the context clearly dictates the contrary.

Where in the foregoing description reference has been made to specific components or integers of the invention having known equivalents then such equivalents are herein incorporated as if individually set forth.

The invention claimed is:

1. A resonant converter including an input for connection to a substantially direct current electrical supply, a resonant circuit, first switching apparatus to selectively provide current from the input to the resonant circuit, second switching apparatus associated with a reactive element of the resonant circuit, a switch controller operable to control the second switching apparatus to vary the effective reactance of the reactive element, and a phase sensor to sense the phase of a voltage or current in the resonant circuit whereby the controller may actuate the second switching apparatus to allow the reactive element to be electrically connected to or disconnected from the resonant circuit a predetermined time period after the phase sensor senses a voltage zero crossing to vary the effective reactance of the reactive element and thereby vary the resonant frequency of the resonant circuit.

2. A resonant converter as claimed in claim 1 wherein the reactive element comprises an inductor.

3. A resonant converter as claimed in claim 2 including a frequency sensor to sense the frequency of the resonant circuit whereby the controller may actuate the second switching apparatus to allow the reactive element to be electrically connected to or disconnected from the resonant circuit dependant on the sensed frequency to alter the frequency of the resonant circuit.

4. A resonant converter as claimed in claim 3 wherein the controller is operable to compare the sensed frequency with a nominal frequency and vary the predetermined time period to alter the resonant circuit frequency toward the nominal frequency.

5. A resonant converter as claimed in claim 4 wherein the controller is adapted to activate the second switching apparatus to connect the inductor to the resonant circuit after the predetermined time period following a voltage zero crossing has elapsed, and allow the second switching apparatus to be deactivated when the voltage again reaches substantially zero.

6. A resonant converter as claimed in claim 5 wherein the controller is capable of varying the predetermined time period between substantially 90 electrical degrees and substantially 150 electrical degrees.

7. A resonant converter as claimed in claim 5 wherein the controller is capable of varying the predetermined time period between substantially 0 electrical degrees and substantially 180 electrical degrees.

8. A resonant converter as claimed in claim 2 wherein the phase sensor senses the frequency of the resonant circuit whereby the controller may actuate the second switching apparatus to allow the reactive element to be electrically connected to or disconnected from the resonant circuit dependant on the sensed frequency to alter the frequency of the resonant circuit.

9. A resonant converter as claimed in claim 2 wherein the inductor is connected in parallel with a tuning capacitor of the resonant circuit.

10. A resonant converter as claimed in claim 2 wherein the inductor has two terminals and the second switching apparatus comprise two controllable semiconductor switching elements, one switching element being connected between each terminal and the resonant circuit.

11. A resonant converter as claimed in claim 10 wherein each switching element has an anti-parallel diode connected thereacross.

12. A resonant converter as claimed in claim 10 wherein the semiconductor switch elements comprise IGBT's, MOSFETS, BJT's, or other semiconductor switches.

13. A resonant converter as claimed in claim 2 wherein the inductor comprises a primary conductive path of an ICPT system.

14. A resonant converter as claimed in claim 2 wherein the inductor comprises an induction heating coil of an induction heating system.

15. A resonant converter as claimed in claim 1 wherein the reactance comprises a capacitor, the phase sensor senses a voltage in the resonant circuit, and the switch controller is operable to switch the second switching apparatus to electrically connect the capacitor to or disconnect the capacitor from the resonant circuit a predetermined time period after a sensed voltage zero crossing.

16. A resonant converter as claimed in claim 15 including a frequency sensor to sense the frequency of the resonant circuit whereby the controller may actuate the second switching apparatus to allow the capacitor to be electrically connected to or disconnected from the resonant circuit dependant on the sensed frequency to alter the frequency of the resonant circuit.

17. A resonant converter as claimed in claim 16 wherein the controller is operable to compare the sensed frequency with a nominal frequency and vary the predetermined time period to alter the resonant circuit frequency toward the nominal frequency.

18. A resonant converter as claimed in claim 17 wherein the controller is adapted to activate the second switching apparatus to disconnect the capacitor from the resonant circuit after the predetermined time period following a voltage zero crossing has elapsed.

19. A resonant converter as claimed in claim 18 wherein the controller is capable of varying the predetermined time period between substantially 0 electrical degrees and substantially 90 electrical degrees.

20. A resonant converter as claimed in claim 15 wherein the phase sensor senses the frequency of the resonant circuit whereby the controller may actuate the second switching apparatus to allow the capacitor to be electrically connected to or disconnected from the resonant circuit dependant on the sensed frequency to alter the frequency of the resonant circuit.

21. A resonant converter as claimed in claim 20 wherein the capacitor is connected in parallel with a tuning capacitor of the resonant circuit.

22. A resonant converter as claimed in claim 21 wherein the capacitance of the capacitor is substantially equal to the capacitance of the tuning capacitor.

23. A resonant converter as claimed in claim 20 wherein the capacitor has two terminals and the second switching apparatus comprises two controllable semiconductor switching elements, one switching element being connected between each terminal and the resonant circuit.

24. A resonant converter as claimed in claim 23 wherein each switching element has an anti-parallel diode connected thereacross.

25. A resonant converter as claimed in claim 23 wherein the semiconductor switch elements comprise IGBT's, MOSFETS, BJT's, or other semiconductor switches.

26. A current fed push-pull resonant converter including an input for connection to a substantially direct current electrical supply, a resonant circuit including a primary conductive path of an ICPT system, first switching apparatus to selectively provide current from the input to the resonant circuit, second switching apparatus associated with a reactive element of the resonant circuit, a switch controller operable to control the second switching apparatus to vary the effective reactance of the reactive element, and a phase sensor to sense the phase of a voltage or current in the resonant circuit whereby the controller may actuate the second switching apparatus to allow the reactive element to be electrically connected to or disconnected from the resonant circuit a predetermined time period after the phase sensor senses a voltage zero crossing to vary the effective reactance of the reactive element and thereby vary the resonant frequency of the resonant circuit.

27. An ICPT system including:
   a. a power supply comprising a resonant converter having a resonant circuit including a primary conductive path of an ICPT system, first switching apparatus to selectively provide current from an input to the resonant circuit, second switching apparatus associated with a reactive element of the resonant circuit, and a switch controller operable to control the second switching apparatus to vary the effective reactance of the reactive element, and a phase sensor to sense the phase of a voltage or current in the resonant circuit whereby the controller may actuate the second switching apparatus to allow the reactive element to be electrically connected to or disconnected from the resonant circuit a predetermined time period after the phase sensor senses a voltage zero crossing to vary the effective reactance of the reactive element and thereby vary the resonant frequency of the resonant circuit; and
   b. one or more secondary pick-ups, each pick-up having a pick resonant circuit comprising a pick-up coil and a tuning capacitor whereby power from the primary conductive path may be transferred to the pick-up by mutual induction between the primary conductive path and the coil.

28. An ICPT system as claimed in claim 27 wherein the primary conductive path comprises one or more turns of electrically conductive material.

29. An ICPT system as claimed in claim 28 wherein the primary conductive path is provided beneath a substantially planar surface.

30. An ICPT system as claimed in claim 27 wherein the primary conductive path includes at least one region about which there is a greater magnetic field strength than one or more other regions of the path.

31. An ICPT system as claimed in claim 27 wherein the primary conductive path includes one or more lumped inductances or one or more distributed inductances.

32. An ICPT system as claimed in claim 27 wherein the primary conductive path is mounted adjacent to an amorphous magnetic material to provide a desired magnetic flux path.

33. An ICPT system as claimed in claim 27 wherein the pick-up includes an amorphous magnetic material adjacent to the pick-up coil to provide a desired magnetic flux path.

34. An ICPT system as claimed in claim 27 wherein the pick-up is battery-free.

35. An ICPT system as claimed in claim 27 wherein the pick-up includes a super-capacitor.

36. A method of frequency stabilisation for a resonant converter having a resonant circuit comprising an inductive reactive element and a capacitive reactive element, the method including the steps of sensing the phase of a voltage or current in the resonant circuit and selectively switching one of the reactive elements into or out of the resonant circuit a predetermined time period after the phase sensor senses a voltage zero crossing to alter the effective inductance or capacitance of the reactive element to thereby control the resonant frequency of the resonant circuit.

37. A method as claimed in claim 36 including sensing the frequency of the resonant circuit activating a switching apparatus to electrically connect or disconnect the reactive element to or from the resonant circuit dependant on the sensed frequency to alter the frequency of the resonant circuit.

38. A method as claimed in claim 37 including comparing the sensed frequency with a nominal frequency and varying the predetermined time period to alter the resonant circuit frequency toward the nominal frequency.

39. A method as claimed in claim 36 wherein the reactive element comprises an inductor and the method includes activating the switching apparatus to connect the reactive element to the resonant circuit after the predetermined time period following a voltage zero crossing has elapsed, and allowing the switching apparatus to be deactivated when the voltage again reaches substantially zero.

40. A method as claimed in claim 39 including selecting the predetermined time period from a range between substantially 90 electrical degrees and substantially 150 electrical degrees.

41. A method as claimed in claim 39 including selecting the predetermined time period from a range between substantially 0 electrical degrees and substantially 180 electrical degrees.

42. A method as claimed in claim 36 wherein the reactive element comprises a capacitor and the method includes activating the switching apparatus to disconnect the reactive element from the resonant circuit after the predetermined time period following a voltage zero crossing has elapsed.

43. A method as claimed in claim 42 including selecting the predetermined time period from a range between 0 electrical degrees and 90 electrical degrees.

44. A method as claimed in claim 42 wherein the switching apparatus connects the reactive element to the resonant circuit at a predetermined interval prior to a voltage zero crossing, the predetermined interval being of substantially the same duration as the predetermined time period.

* * * * *